United States Patent Office 3,111,542
Patented Nov. 19, 1963

3,111,542
HINDERED AMINO ALCOHOLS AND KETONES
Wilbur J. Doran and Nelson R. Easton, Indianapolis, Ind., assignors to Eli Lilly and Company, Indianapolis, Ind., a corporation of Indiana
No Drawing. Filed July 20, 1960, Ser. No. 44,004
5 Claims. (Cl. 260—584)

This invention relates to a novel group of hindered amino alcohols and ketones and to their nontoxic pharmaceutically-acceptable acid addition salts.

The hindered amino alcohols and ketones of this invention can be represented by the following formulas:

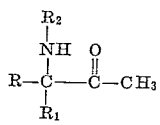

and

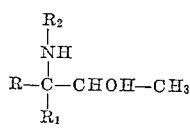

wherein R is methyl or ethyl, $R_1$ is methyl, ethyl, isopropyl or t-butyl, and $R_2$ is isopropyl, t-butyl or t-amyl. Also included within the scope of this invention are nontoxic pharmaceutically-acceptable acid addition salts of free bases represented by the above formulas. By the term "nontoxic pharmaceutically-acceptable acid addition salts" is meant the reaction products of nontoxic acids and the above amines to form salts whose mammalian toxicity is not substantially greater than the toxicity of the amine free base itself. Among nontoxic acids useful for forming these pharmaceutically-acceptable acid addition salts are both inorganic and organic acids; for example, hydrochloric acid, sulfuric acid, phosphoric acid, hydrobromic acid, maleic acid, cinnamic acid, benzoic acid, tartaric acid, succinic acid, and the like.

Illustrative compounds coming within the scope of this invention are the following: 3-t-butylamino-3-methyl-2-pentanone, 3-isopropylamino-3-methyl-2-butanone sulfate, 3-isopropylamino-3,4,4-trimethyl-2-pentanol, 3-t-amylamino-3-ethyl-3-pentanone hydrobromide, 3-isopropylamino-3-ethyl-2-pentanol, 3-isopropylamino-3,4-dimethyl-2-pentanol hydrochloride, 3-t-amylamino-3-methyl-2-pentanol tartrate, and the like.

The free bases of this invention are volatile oils having a fishy odor. The nontoxic pharmaceutically-acceptable acid addition salts of the free bases are white, crystalline solids, soluble in most polar solvents including water. The amino ketone free bases of this invention are prepared by hydrating the corresponding acetylene, e.g. by using aqueous sulfuric acid as the hydrating agent with mercuric oxide as a catalyst. The amino alcohols of this invention are conveniently prepared by reducing one of the above amino ketones or an acid addition salt thereof to the corresponding amino alcohol by the action of sodium borohydride, lithium aluminum hydride, or the like, or alternatively by low pressure catalytic hydrogenation.

The amino acetylenes employed as starting materials in the preparation of the amino ketones and alcohols of this invention are prepared from the corresponding chloroacetylenes by the method of Hennion and Nelson, J. Am. Chem. Soc., 79, 2142 (1957). The chloro-acetylenes themselves are prepared from the corresponding hydroxy acetylene by employing, with certain modifications, the method of Hennion and Maloney, J. Am. Chem. Soc., 73, 4735 (1951).

The compounds of this invention either in the form of the free base or as a nontoxic pharmaceutically-acceptable acid addition salt of the free base show activity as ganglionic blocking agents, and this activity can be demonstrated when the compound is administered by the oral route.

This invention is further illustrated by the following specific examples:

EXAMPLE 1

*Preparation of 3-t-Butylamino-3-Methyl-2-Pentanone*

A mixture was prepared containing 49 g. of water, 49 ml. of methanol, 45 g. of 18 M sulfuric acid and 6 g. of mercuric oxide. The mixture was heated to about 70° C. and 30 g. of 3-t-butylamino-3-methyl-1-pentyne were added. The reaction mixture was heated at 80° C. for about 3 hours, thus forming 3-t-butylamino-3-methyl-2-pentanone. 100 g. of potassium carbonate and 200 ml. of a saturated sodium carbonate solution were added to the reaction mixture, thereby converting 3-t-butylamino-3-methyl-2-pentanone sulfate to the corresponding free base. The free base was insoluble in the alkaline solution and was extracted with 200 ml. of ether. The ethereal layer was separated and was dried. A slight excess of a solution of ethanol saturated with hydrogen chloride was added, thus forming 3-t-butylamino-3-methyl-2-pentanone hydrochloride which precipitated. The precipitate was separated by filtration and was recrystallized from an ethyl acetate-acetone solvent mixture. 3-t-butylamino-3-methyl-2-pentanone hydrochloride thus prepared melted at about 152–154° C.

*Analysis.*—Calc.: N, 6.74. Found: N, 6.71.

3-t-butylamino-3-methyl-2-pentanone free base can be prepared from the hydrochloride salt by dissolving the salt in water, making the acidic aqueous solution alkaline to litmus, extracting the liberated free base with ether, separating and drying the ethereal solution and purifying the free base by distillation.

EXAMPLE 2

*Preparation of 3-Isopropylamino-3-Methyl-2-Pentanone*

The procedure of Example 1 was followed except that 28 g. of 3-isopropylamino-3-methyl-1-pentyne were employed in place of 3-t-butylamino-3-methyl-1-pentyne. The ethereal extract containing 3-isopropylamino-3-methyl-2-pentanone free base formed when the acid reaction mixture was contacted with potassium carbonate, was separated and was dried. The ether was removed by evaporation at atmospheric pressure, leaving a residue comprising 3-isopropylamino-3-methyl-2-pentanone. The residue was distilled, and fractions boiling in the range 64–70° C. at a pressure of about 5 mm. of mercury were collected and combined. The combined fractions were dissolved in ethyl acetate and the resulting solution was saturated with anhydrous hydrogen chloride gas. 3-isopropylamino-3-methyl-2-pentanone hydrochloride precipitated and was collected by filtration. 3-isopropylamino-3-methyl-2-pentanone hydrochloride melted at about 99–101° C.

*Analysis.*—Calc.: N, 7.23. Found: N, 7.20.

EXAMPLE 3

*Preparation of 3-Isopropylamino-3-Ethyl-2-Pentanone*

30 g. of 3-isopropylamino-3-ethyl-1-pentyne were hydrated by the procedure of Example 1 to yield 3-isopropylamino-3-ethyl-2-pentanone. The compound was isolated as a free base by adding potassium carbonate to the acidic hydration mixture as in Example 1. 3-isopropylamino-3-ethyl-2-pentanone free base was insoluble in the alkaline layer and was extracted with ether. The ether layer was separated, and the ether was removed by evaporation in vacuo. The resulting residue comprising 3-isopropylamino-3-ethyl-2-pentanone was dissolved in ethyl acetate, and the ethyl acetate solution was saturated with anhydrous hydrogen chloride gas. The resulting precipitate of 3-isopropylamino-3-ethyl-2-pentanone hydrochloride was separated by filtration. Qualitative analysis of the precipitate showed the presence of mercury. The precipitate was dissolved in dilute hydrochloric acid and the acidic solution was saturated with hydrogen sulfide gas. The solution was filtered to remove mercuric sulfied thus formed and the filtrate was evapoarted to dryness in vacuo. Recrystallization of the residue from ethyl acetate yielded 3-isopropylamino-3-ethyl-2-pentanone hydrochloride melting at about 135–136° C.

*Analysis.*—Calc.: N, 6.74. Found: N, 6.36.

3-isopropylamino-3-ethyl-2-pentanone free base can be prepared from the hydrochloride salt by dissolving the salt in water, making the acidic aqueous solution alkaline to litmus, extracting the liberated free base with ether, separating and drying the ethereal solution, and purifying the free base by distillation.

EXAMPLE 4

*Preparation of 3-t-Butylamino-3-Methyl-2-Butanone*

40 g. of 3-t-butylamino-3-methyl-1-butyne were hydrated according to the process of Example 1 by adding the acetylene compound to a mixture containing 55 g. of 18 M sulfuric acid, 60 ml. each of water and methanol, and 7.5 g. of mercuric oxide. The addition of the 3-t-butylamino-3-methyl-1-butyne required 1.5 hours. During the addition, the temperature of the reaction was maintained at about 70° C. Another 7.5 g. of mercuric oxide were added and the heating was maintained for an additional 1.5 hours. The reaction mixture was cooled and was made alkaline to litmus with 50 percent aqeuous sodium hydroxide. 3-t-butyl-amino-3-methyl-2-butanone, being insoluble in the alkaline solution, separated and was extracted with 200 ml. of ether. The ether extract was contacted wtih 150 ml. of 10 percent aqueous hydrochloric acid, thus forming 3-t-butylamino-3-methyl-2-butanone hydrochloride which passed into the aqueous layer. The acidic aqueous layer was decolorized with activated charcoal. The charcoal was removed by filtration, and the filtrate was made alkaline to litmus with 50 percent aqueous sodium hydroxide. 3-t-butylamino-3-methyl-2-butanone separated from the alkaline filtrate as an oil and was extracted with 200 ml. of ether. The ether extract was separated and was dried over solid potassium carbonate. The ether was removed by evaporation in vacuo, leaving a residue comprising, 3-t-butylamino-3-methyl-2-butanone, which was distilled. 3-t-butylamino-3-methyl-2-butanone boiled at about 104° C. at 58 mm. of mercury; $n_D^{25}=1.434$.

Following the procedure of Example 1, an ethereal solution of the free base was mixed with ethanolic hydrogen chloride, thus forming an insoluble precipitate of 3-t-butylamino-3-methyl-2-butanone hydrochloride. The precipitate was separated by filtration and was recrystallized from a mixture of isopropanol and ethanol. 3-t-butylamino-3-methyl-2-butanone hydrochloride thus purified melted at about 208° C.

3-t-amylamino-3-methyl-2-butanone hydrochloride was prepared by substituting t-amyl amine for t-butyl amine in the above example. The compound melted at about 123–125° C.

*Analysis.*—Calc.: N, 6.74; Cl, 17.07. Found: N, 6.67; Cl, 17.43.

EXAMPLE 5

*Preparation of 3-t-Butylamino-3-Ethyl-2-Pentanone*

Following the procedure of Example 1, 50 g. of 3-t-butylamino-3-ethyl-1-pentyne were hydrated to yield 3-t-butylamino-3-ethyl-2-pentanone. The compound was isolated and converted to the hydrochloride salt by the procedure of Example 1. 3-t-butylamino-3-ethyl-2-pentanone hydrochloride melted at about 173–175° C. after recrystallization from a mixture of ethyl acetate and isopropanol.

*Analysis.*—Calc. C, 59.57; H, 10.91; N, 6.32. Found: C, 59.87; H, 11.02; N, 6.70.

3-t-butylamino-3-ethyl-2-pentanone free base can be prepared from the hydrochloride salt by the procedure set forth in Example 1.

EXAMPLE 6

*Preparation of 3-Isopropylamino-3-Methyl-2-Butanone*

Following the procedure of Example 1, 3-isopropylamino-3-methyl-1-butyne was hydrated to yield 3-isopropylamino-3-methyl-2-butanone. The compound was isolated and converted to the hydrochloride salt by the procedure set forth in Example 1. 3-isopropylamino-3-methyl-2-butanone hydrochloride melted at about 131–133° C.

3-isopropylamino-3-methyl-2-butanone free base can be prepared from the hydrochloride salt by the procedure set forth in Example 1.

EXAMPLE 7

*Preparation of 3-Isopropylamino-3,4-Dimethyl-2-Pentanone*

Following the procedure of Example 1, 3-isopropylamino-3,4-dimethyl-1-pentyne was hydrated to yield 3-isopropylamino-3,4-dimethyl-2-pentanone. The compound was isolated and converted to the hydrochloride salt by the procedure set forth in Example 1.

3-isopropylamino-3,4-dimethyl-2-pentanone free base was prepared from the hydrochloride salt by the procedure set forth in Example 1. It distilled in the range 78–80° C. at a pressure of about 10 mm. of mercury.

EXAMPLE 8

*Preparation of 3-t-Butylamino-3,4-Dimethyl-2-Pentanone*

Following the procedure of Example 1, 3-t-butylamino-3,4-dimethyl-1-pentyne was hydrated to yield 3-t-butylamino-3,4-dimethyl-2-pentanone. The compound was isolated and converted to the hydrochloride salt by the procedure set forth in Example 1. 3-t-butylamino-3,4-dimethyl-2-pentanone hydrochloride melted at about 138–140° C.

*Analysis.*—Calc.: N, 6.32. Found: N, 6.21.

3-t-butylamino-3,4-dimethyl-2-pentanone free base can be prepared from the hydrochloride salt by the procedure set forth in Example 1.

PREPARATION OF AMINO ALCOHOLS

The amino alcohols useful in the therapeutic process and medicaments of this invention are readily prepared by reducing the corresponding secondary and tertiary amino ketones. The reduction is most conveniently carried out with sodium borohydride in alcohol solution or by lithium aluminum hydride in ethereal solution. Catalytic hydrogenation of the ketone can, of course, also be employed with equal success.

The preparation of the secondary and tertiary amino alcohols of this invention is more fully illustrated by the following specific examples:

EXAMPLE 9

*Preparation of 3-Isopropylamino-3-Ethyl-2-Pentanol*

12 g. of 3-isopropylamino-3-ethyl-2-pentanone hydrochloride were dissolved in water. The acidic aqueous solution was made basic to litmus by the addition of solid potassium carbonate. 3-isopropylamino-3-ethyl-2-pentanone was insoluble in the alkaline solution and was extracted with 150 ml. of ether. The ethereal layer was separated, was dried and a majority of the ether was removed by evaporation on a steam bath at atmospheric pressure. The resulting concentrate, containing some residual ether, was dissolved in 100 ml. of ethanol and 2.3 g. of sodium borohydride were added to the solution.

The reaction mixture was allowed to remain overnight at ambient room temperature. 200 ml. of water were added that the mixture was extracted with 250 ml. of ether. The ethereal layer containing 3-isopropylamino-3-ethyl-2-pentanol formed in the above reaction, was separated and was dried. Anhydrous hydrogen chloride gas was bubbled into the dried ethereal solution, thus forming 3-isopropylamino - 3 - ethyl - 2 - pentanol hydrochloride. The solvent was removed by distillation in vacuo. Recrystallization of the resulting residue from a mixture of ethyl acetate and isopropanol yielded 3-isopropylamino-3-ethyl-2-pentanol hydrochloride melting at about 126–127° C.

*Analysis.*—Calc.: N, 6.68. Found: N, 6.54.

3-isopropylamino-3-ethyl-2-pentanol free base can be prepared from the hydrochloride salt by dissolving the salt in water, making the aqueous solution alkaline to litmus, extracting the liberated free base with ether, separating and drying the ethereal solution, and purifying the free base by distillation.

EXAMPLE 10

*Preparation of 3-t-Butylamino-3-Ethyl-2-Pentanol*

Following the procedure of Example 9, 5.4 g. of 3-t-butylamino-3-ethyl-2-pentanone hydrochloride were converted to the corresponding free base which was obtained in ether solution. A majority of the ether was removed by evaporation in vacuo. The resulting residue, comprising 3-t-butylamino-3-ethyl-2-pentanone free base was dissolved in ethanol and reduced with 2.2 g. of sodium borohydride in ethanolic solution as in Example 9. 3-t-butylamino-3-ethyl-2-pentanol formed in the above reaction was isolated as the free base. It was converted by the procedure of Example 9 to the hydrochloride salt. 3-t-butylamino-3-ethyl-2-pentanol hydrochloride melted at about 141–142° C. after recrystallization from a mixture of ethyl acetate and isopropyl alcohol.

*Analysis.*—Calc.: N, 6.26. Found: N, 6.16.

EXAMPLE 11

*Preparation of 3-t-Butylamino-3-Methyl-2-Pentanol*

Following the procedure of Example 9, 3-t-butylamino-3-methyl-2-pentanone hydrochloride was converted to the corresponding free base which was obtained as an ethereal solution. A majority of the ether was evaporated in vacuo and the resulting residue comprising 3-t-butylamino-3-methyl-2-pentanone free base dissolved in ethanol and reduced with sodium borohydride as set forth in Example 9. 3-t-butylamino - 3 - methyl - 2 - pentanol formed in the above reaction was isolated as the free base, and the free base was converted to the corresponding hydrochloride salt by the procedure of Example 9. 3-t-butylamino-3-methyl - 2 - pentanol hydrochloride thus prepared was recrystallized from ethyl acetate. It melted at about 126–127° C.

*Analysis.*—Calc.: N, 6.68. Found: N, 6.43.

3-isopropylamino-3-methyl-2-pentanol is prepared by substituting 3-isopropylamino-3-methyl-2 - pentanone for 3-t-btuylamino-3-methyl-2-pentanone is the above example.

EXAMPLE 12

*Preparation of 3-t-Butylamino-3-Methyl-2-Butanol*

Following the procedure of Example 9, 10 g. of 3-t-butylamino-3-methyl-2-butanone hydrochloride were dissolved in 50 ml. of methanol. One gram of sodium borohydride was added to the solution of the ketone with stirring, thereby forming 3-t-butylamino-3-methyl-2-butanol by reduction. The butanol was isolated as the free base and was converted to the corresponding hydrochloride salt by the procedure of Example 9. 3-t-butylamino-3-methyl - 2 - butanol hydrochloride thus prepared melted at about 154–156° C.

*Analysis.*—Calc.: C, 55.22; H, 11.33; N, 7.16. Found: C, 55.68; H, 11.22; N, 7.23.

3-t-amylamino-3-methyl-2 - butanol hydrochloride was prepared by substituting 3-t-amylamino-3-methyl-2-butanone hydrochloride for 3-t-butylamino-3-methyl-2-butanone hydrochloride in the above example. The compound melted at about 72–75° C.

*Analysis.*—Calc.: N, 6.88; Cl, 16.90. Found: N, 6.42; Cl, 17.12.

3-t-amylamino-3-methyl-2-butanol free base can be prepared from the hydrochloride salt by the procedure set forth in Example 1.

EXAMPLE 13

*Preparation of 3-Isopropylamino-3-Methyl-2-Butanol*

Following the procedure of Example 9, 3-isopropylamino-3-methyl-2-butanone was dissolved in ethanol and reduced with sodium borohydride to yield 3-isopropylamino-3-methyl-2-butanol which was isolated as the free base. The free base was converted to the corresponding hydrochloride salt by the procedure of Example 9. 3-isopropylamino-3-methyl-2-butanol hydrochloride melted at about 125–127° C.

EXAMPLE 14

*Preparation of 3-Isopropylamino-3,4-Dimethyl-2-Pentanol*

Following the procedure of Example 9, 3-isopropylamino-3,4-dimethyl-2-pentanone was dissolved in ethanol and reduced with sodium borohydride to yield 3-isopropylamino-3,4-dimethyl-2-pentanol which was isolated as the free base. The free base was converted to the corresponding hydrochloride salt by the procedure of Example 9. 3-isopropylamino-3,4-dimethyl-2-pentanol hydrochloride melted at about 118–120° C.

*Analysis.*—Calc.: N, 6.68. Found: N, 6.84.

EXAMPLE 15

*Preparation of 3-t-Butylamino-3,4-Dimethyl-2-Pentanol*

Following the procedure of Example 9, 3-t-butylamino-3,4-dimethyl-2-pentanone was dissolved in ethanol and reduced with sodium borohydride to yield 3-t-butylamino-3,4-dimethyl-2-pentanol which was isolated as the free base. The free base was converted to the corresponding hydrochloride salt by the procedure of Example 9. 3-t-butylamino-3,4-dimethyl-2-pentanol hydrochloride melted at about 104–106° C.

*Analysis.*—Calc.: N, 6.26. Found: N, 5.96.

EXAMPLE 16

*Preparation of 3-Isopropylamino-3,4,4-Trimethyl-2 Pentanol*

Following the procedure of Example 1, 3-isopropylamino-3,4,4-trimethyl-1-pentyne was hydrated to yield 3-isopropylamino-3,4,4-trimethyl-2-pentanone. The compound was not isolated but was dissolved in ethanol and reduced with sodium borohydride to yield 3-isopropylamino-3,4,4-trimethyl-2-pentanol by the procedure of Example 9. The 3-isopropylamino-3,4,4-trimethyl-2-pentanol free base was converted to the corresponding hydrochloride salt by the procedure of Example 10. 3-isopropylamino-3,4,4 - trimethyl - 2 - pentanol hydrochloride melted at about 130–132° C.

*Analysis.*—Calc.: N, 6.26. Found: N, 6.13.

EXAMPLE 17

*Preparation of Salts*

Salts of secondary amino ketones and alcohols can be prepared by dissolving the free base in a solvent and adding thereto a solution containing an equivalent amount of the acid. If ether is used as a solvent, the acid salt of the amine is usually insoluble therein and can be isolated by filtration. If, on the other hand, a solvent such as ethanol is used in which the amine salt is soluble, the salt is isolated by evaporation of the solvent. As is well known in the art, salts of acids which can be obtained in gaseous form such as hydrogen chloride can also be prepared by bubbling the gaseous acid into a solution of the amine. The resulting salt is, as before, isolated according to whether it is soluble or insoluble in the solvent employed.

As previously stated, the acetylenic amines useful as starting materials for the preparation of the amino alcohols and ketones of this invention are prepared by the method of Hennion and Nelson, J. Am. Chem. Soc., 79, 2142 (1957). According to this procedure, an acetylenic chloride is reacted with a primary or secondary amine, preferably in aqueous solution and in the presence of a copper salt or of copper bronze powder. If no copper catalyst is used, the reaction between the acetylenic chloride and the primary or secondary amine takes considerable time even with heating. The use of the catalyst, however, greatly shortens the reaction time, and in most instances the reaction proceeds spontaneously without external heating.

In carrying out the reaction between an acetylenic chloride and an amine, an excess of the amine is customarily employed, the excess amine serving to react with the hydrogen chloride produced as a by-product in the reaction. A ratio of from 2 to 3 moles of amine per mole of acetylenic chloride is customarily employed. However, if the amine is difficult to obtain, an excess of a nonreacting basic substance can be employed in conjunction with an equimolar amount of the amine. For example, an inorganic base such as aqueous potassium hydroxide or sodium hydroxide can be used. In addtiion, organic bases which do not react with an acetylenic halide, e.g. tertiary amines such as triethyl amine or pyridine, can also be employed.

The preparation of the acetylenic amine starting materials is illustrated by the following specific examples:

PREPARATION A

*Preparation of 3-Isopropylamino-3-Methyl-1-Butyne*

Five-ml. portions of 44.3 g. of isopropylamine were added to about 25 ml. of water. 25.5 g. of 3-chloro-3-methyl-1-butyne were added to the aqueous amine and the resulting homogeneous solution was allowed to stand at ambient room temperature for about one week. The reaction mixture had by this time separated into two layers. The reaction mixture was poured into a mixture containing 200 ml. of water and 200 ml. of ether. The aqueous layer was separated and discarded. The ethereal layer containing 3-isopropylamino-3-methyl-1-butyne formed in the above reaction was washed with two 100-ml. portions of water and was dried over solid potassium hydroxide. 3-isopropylamino-3-methyl-1-butyne was distilled and fractions boiling between 110–121° C. were collected. Redistillation of the combined fractions through a 30 cm. Vigreux column yielded purified 3-isopropylamino-3-methyl-1-butyne distilling in the range 115–118° C.; $n_D^{25}=1.419$. The distillate solidified upon standing and yielded crystalline 3-isopropylamino-3-methyl-1-butyne, melting at about 27° C.

*Analysis.*—Calc.: C, 76.74; H, 12.08. Found: C, 76.57; H, 12.19.

3-isopropylamino-3-methyl-1-butyne was converted to the corresponding hydrochloride salt by dissolving the free base in ethanol and adding an excess of a solution of ethanol saturated with hydrogen chloride. The ethanol was evaporated in vacuo, leaving the hydrochloride as a residue. Recrystallization of the residue from a mixture of ethyl acetate and isopropyl alcohol yielded 3-isopropylamino-3-methyl-1-butyne hydrochloride melting at about 204–206° C.

*Analysis.*—Calc.: C, 59.43; H, 9.98; N, 8.66. Found: C, 59.30; H, 9.94; N, 8.55.

PREPARATION B

*Preparation of 3-t-Butylamino-3-Methyl-1-Butyne*

Following the procedure disclosed in Preparation A, 700 ml. of distilled water were added to 1,533 g. of t-butylamine. 714.5 g. of 3-chloro-3-methyl-1-butyne were added to the aqueous amine solution and the reaction mixture was allowed to stand at ambient room temperature for 11 days. 3-t-butylamino-3-methyl-1-butyne formed in the above reaction was isolated by the method set forth under Preparation A and was purified by distillation through a Widmer column. The compound boiled at about 72–72.5° C. at a pressure of about 84 mm. of mercury; $n_D^{25}=1.430$. The distillate crystallized upon cooling to 0° C. It melted at about 24° C.

*Analysis.*—Calc.: N, 10.06. Found: N, 10.24.

3-t-butylamino-3-methyl-1-butyne hydrochloride was prepared by dissolving 5 g. of 3-t-butylamino-3-methyl-1-butyne in 25 ml. of anhydrous ether. The solution was cooled to about 0° C. and a 10 percent excess of a saturated ethereal hydrogen chloride solution was added. 3-t-butylamino-3-methyl-1-butyne hydrochloride precipitated and was separated by filtration. The precipitate was twice recrystallized from an ethanol-ethyl acetate solvent mixture. 3-t-butylamino-3-methyl-1-butyne hydrochloride thus purified melted at about 221–223° C.

*Analysis.*—Calc.: C, 61.52; H, 10.33; N, 7.97. Found: C, 61.27; H, 10.00; N, 8.16.

PREPARATION C

*Preparation of 3-Isopropylamino-3-Ethyl-1-Pentyne*

150 ml. of water were mixed with 266 g. of isopropylamine in a one-liter, three-neck flask equipped with stirrer and thermometer. 195.8 g. of 3-chloro-3-ethyl-1-pentyne were added to the aqueous amine solution followed by about 600 mg. of copper-bronze powder. The temperature of the reaction mixture quickly rose to about 65° C. The reaction mixture was maintained at about 40° C. by external cooling for about 4 hours. After standing overnight at ambient room temperature, the reaction mixture was poured into a mixture of 800 ml. of ether and 400 ml. of water. The organic layer was separated and the aqueous layer was extracted with two 250-ml. portions of ether. The ethereal layers were combined and were contacted with 500 ml. of 12 N hydrochloric acid diluted with an equal volume of water. 3-isopropylamino-3-ethyl-1-pentyne formed in the above reaction was converted to the corresponding hydrochloride salt, which was soluble in the aqueous layer. The organic layer was separated and was discarded. The aqueous layer was made alkaline to litmus by the addition of 50 percent sodium hydroxide. 3-isopropylamino-3-ethyl-1-pentyne free base, being insoluble in the alkaline layer, separated and was extracted with three 250-ml. portions of ether. The ethereal layer was separated and was dried. The ether was removed by distillation through a Widmer column, leaving as a residue 3-isopropylamino-3-ethyl-1-pentyne which was distilled through a Vigreux column. 3-isopropylamino-3-ethyl-1-pentyne boiled at about 71° C. at a pressure of about 25 mm. of mercury; $n_D^{25}=1.433$.

*Analysis.*—Calc.: N, 9.14. Found: N, 9.12.

Following the procedure of Preparation B, 3-isopropylamino-3-ethyl-1-pentyne was converted to the corresponding hydrochloride salt, which melted at about 222–223° C.

*Analysis.*—Calc.: C, 63.30; H, 10.63; N, 7.38. Found: C, 63.58; H, 10.80; N, 7.40.

Table I, which follows, lists other amino acetylenes prepared by one of the above procedures. The table also lists the chloro-acetylene used as the starting material, the boiling point and refractive index of the amino acetylene prepared therefrom, and the melting point of the corresponding amino acetylene hydrochloride. The preparation method used in synthesizing the free base and the hydrochloride salt is also indicated, the letter used referring to either Preparation A, B or C above.

TABLE I

| Starting Material | Final Product | Method of Preparation | Boiling Range | Refractive Index ($n_D^{25}$) | Melting Point of Hydrochloride, °C. | Method of Preparation of Hydrochloride |
|---|---|---|---|---|---|---|
| 3-Chloro-3-methyl-1-pentyne | 3-isopropylamino-3-methyl-1-pentyne. | A | 77–77.5° C. at 93 mm. of Hg. | 1.426 | 196–197 | B |
| Do | 3-t-butylamino-3-methyl-1-pentyne. | A | 65° C. at 25 mm. of Hg | 1.437 | 204–205 | B |
| 3-Chloro-3-ethyl-1-pentyne | 3-t-butylamino-3-ethyl-1-pentyne. | A | 75° C. at 23 mm. of Hg | 1.440 | 267–268 | B |
| 3-Chloro-3-methyl-1-butyne | 3-t-amylamino-3-methyl-1-butyne. | A | 51° C. at 6 mm. of Hg | 1.437 | 167–169 | (1) |
| 3-Chloro-3,4-dimethyl-1-pentyne. | 3-isopropylamino-3,4-dimethyl-1-pentyne. | A | 58–60° C. at 50 mm. of Hg. |  | 179–181 | (1) |
| 3-Chloro-3,4,4-trimethyl-1-pentyne. | 3-isopropylamino-3,4,4-trimethyl-1-pentyne. | A | 110–130° C. at 104 mm. of Hg. | 1.445 | 198–199 | A |
| 3-Chloro-3,4-dimethyl-1-pentyne. | 3-t-butylamino-3,4-dimethyl-1-pentyne. | C | 96–98° C. at 58 mm. of Hg. | 1.400 | above 280 | B |

[1] Hydrochloride prepared by adding ethanolic hydrogen chloride to ethereal solution of free base.

The procedure used to prepare the chloro-acetylene intermediates useful in the synthesis of the compounds of the invention was patterned with certain modifications after that of Hennion and Maloney, J. Am. Chem. Soc., 73, 4735 (1951). The preparation of 3-chloro-3-methyl-1-butyne which follows, is typical of the modified procedure used in preparing both the novel chloro-acetylenes and those of the prior art useful as intermediates in preparing the amino acetylenes of this invention.

PREPARATION D

Preparation of 3-Chloro-3-Methyl-1-Butyne 167 g. of calcium chloride and 2 g. of copper bronze powder were mixed in a one-liter, round-bottomed flask. 168 g. of 3-methyl-1-butyne-3-ol were added, and the resulting mixture was cooled to about 10° C. About 600 ml. of 12 N hydrochloric acid cooled to 0° C., were added in three 200-ml. portions with slight shaking. The reaction mixture was maintained at about 10–15° C. for about 15 minutes and was then allowed to warm up slowly to ambient room temperature. After a total reaction time of about one hour, the lower acidic aqueous layer was separated and was discarded. The organic layer was washed twice with 200-ml. portions of distilled water followed by a 100 ml. portion of a 10 percent sodium bicarbonate solution. The washes were all discarded. The organic layer was then steam distilled until about 90 percent of the organic layer had distilled. The aqueous portion of the distillate was separated and discarded. The organic layer containing 3-chloro-3-methyl-1-butyne formed in the above reaction was dried over solid anhydrous potassium carbonate and was then distilled through an electrically heated 60 cm. fractionating column. The fraction distilling in the range 72–77° C. at atmospheric pressure was collected. Redistillation of this fraction through the same column gave 105 g. of purified 3-chloro-3-methyl-1-butyne boiling in the range 74–76° C. at atmospheric pressure; $n_D^{25}=1.416$.

Table II, which follows, lists other chloro-acetylenes prepared by following the above procedure. In addition, the table lists the hydroxy acetylene used as the starting material as well as the boiling point and refractive index of the chloro-acetylene prepared therefrom.

TABLE II

| Starting Material | Final Product | Boiling Range | Refractive Index ($n_D^{25}$) |
|---|---|---|---|
| 3,4-Dimethyl-1-pentyn-3-ol. | 3-chloro-3,4-dimethyl-1-pentyne. | 54–55° C. at 52 mm. of Hg. | 1.448 |
| 3,4,4-Trimethyl-1-pentyn-3-ol. | 3-chloro-3,4,4-trimethyl-1-pentyne. | 82° C. at 94 mm. of Hg. |  |

The procedure used to prepare the hydroxy acetylene intermediates useful as ultimate starting materials for preparing the compounds of this invention is that of Hennion and Froning, J. Am. Chem. Soc., 62, 654 (1940). For example, 3,4,4-trimethyl-1-pentyne-3-ol was prepared from methyl t-butyl ketone and acetylene by following the above procedure. 3,4,4-trimethyl-1-pentyne-3-ol boiled at about 88–90° C. at a pressure of about 100 mm. of mercury; $n_D^{25}=1.438$.

We claim:
1. A compound chosen from the class consisting of a free base and its salts formed with nontoxic pharmaceutically-acceptable acids, said free base being represented by the following formula:

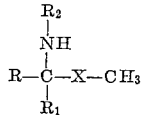

wherein R is a radical of the group consisting of methyl and ethyl, $R_1$ is a radical of the group consisting of methyl, ethyl, isopropyl and t-butyl, $R_2$ is a radical of the group consisting of isopropyl, t-butyl and t-amyl, and X is a member of the group consisting of

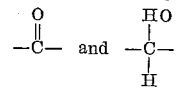

2. 3-t-butylamino-3-methyl-2-butanone.
3. 3-t-butylamino-3-methyl-2-pentanone.
4. 3-t-butylamino-3-methyl-2-butanol.
5. 3-t-butylamino-3-methyl-2-pentanol.

References Cited in the file of this patent

UNITED STATES PATENTS 2,363,465    Senkus    Nov. 21, 1944
2,689,263    Schmidle et al.    Sept. 14, 1954